United States Patent
Vaidya et al.

(10) Patent No.: US 11,450,116 B2
(45) Date of Patent: Sep. 20, 2022

(54) SYSTEMS AND METHODS FOR SHARING CAMERA SETTING CONTROL AMONG MULTIPLE IMAGE PROCESSING COMPONENTS IN A VEHICLE

(71) Applicant: Ford Global Technologies, LLC, Dearborn, MI (US)

(72) Inventors: Akshay Vaidya, Canton, MI (US); David Michael Herman, Oak Park, MI (US); Yashanshu Jain, Dearborn, MI (US); Brian Quinn Kettlewell, Cambridge (CA); Kyle Sorensen, Canton, MI (US); Ali Husain, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 283 days.

(21) Appl. No.: 16/812,849

(22) Filed: Mar. 9, 2020

(65) Prior Publication Data
US 2021/0279479 A1    Sep. 9, 2021

(51) Int. Cl.
*G06V 20/56* (2022.01)
*G06F 13/16* (2006.01)
(Continued)

(52) U.S. Cl.
CPC .......... *G06V 20/56* (2022.01); *G05D 1/0094* (2013.01); *G06F 13/161* (2013.01); *G06V 20/64* (2022.01)

(58) Field of Classification Search
CPC .... G06V 20/56; G06V 20/64; G06K 9/00791; G06K 9/00201; G05D 1/0094; G06F 13/161
See application file for complete search history.

(56) References Cited

U.S. PATENT DOCUMENTS

| 10,257,416 B2 | 4/2019 | Kim et al. |
| 2005/0125797 A1 | 6/2005 | Gabrani et al. |

(Continued)

FOREIGN PATENT DOCUMENTS

| CN | 106132753 A | * 11/2016 | ............. B60K 35/00 |
| DE | 102017202719 A1 | * 8/2017 | ............ B60W 10/04 |

(Continued)

*Primary Examiner* — Carol Wang
(74) *Attorney, Agent, or Firm* — Frank Lollo; Eversheds Sutherland (US) LLP

(57) ABSTRACT

The disclosure is generally directed to systems and methods for sharing a video feed of a camera among multiple image processing components in a vehicle. A first priority may be applied to a first image processing component that performs a first image processing function. A second priority that is lower than the first priority, is applied to a second image processing component that performs a second image processing function. The first function may be deemed more important than the second function due to various reasons. Consequently, the first image processing component is offered priority to apply a first set of camera settings on the camera. The second image processing component may prefer to apply a different set of camera settings for executing the second image processing function. An access arbitrator allows the second image processing component to do so when the first image processing component relinquishes control of the camera.

9 Claims, 5 Drawing Sheets

(51) Int. Cl.
*G05D 1/00* (2006.01)
*G06V 20/64* (2022.01)

(56) References Cited

U.S. PATENT DOCUMENTS

| | | | | |
|---|---|---|---|---|
| 2011/0279251 | A1* | 11/2011 | Yamada | G08G 1/096783 |
| | | | | 340/425.5 |
| 2016/0018511 | A1 | 1/2016 | Nayyar et al. | |
| 2018/0052457 | A1* | 2/2018 | Kim | G06V 20/56 |
| 2018/0081670 | A1* | 3/2018 | Caushi | H04L 67/325 |
| 2019/0258259 | A1* | 8/2019 | Yanagihara | B60W 30/0956 |
| 2020/0090347 | A1* | 3/2020 | Ozasa | G05D 1/0088 |
| 2020/0284883 | A1* | 9/2020 | Ferreira | G01S 17/894 |
| 2021/0403015 | A1* | 12/2021 | Kato | B60Q 1/00 |

FOREIGN PATENT DOCUMENTS

| | | | | | |
|---|---|---|---|---|---|
| EP | 3477882 | A1 | * | 5/2019 | H03M 13/6312 |
| JP | 2004320642 | A | * | 11/2004 | |
| JP | 2010210278 | A | * | 9/2010 | |
| WO | WO-2008139328 | A2 | * | 11/2008 | G06F 9/4831 |
| WO | 2019094843 | A1 | | 5/2019 | |

* cited by examiner ness of the first image processing component and the second image processing component has to accept these settings and execute its own functions in a sub-optimal manner.

It is therefore desirable to provide a solution that would allow camera settings of a camera to be changed in order to cater to different image processing functions in a vehicle.

SYSTEMS AND METHODS FOR SHARING CAMERA SETTING CONTROL AMONG MULTIPLE IMAGE PROCESSING COMPONENTS IN A VEHICLE

FIELD OF THE DISCLOSURE

This disclosure generally relates to vehicles, and more particularly relates to systems and methods for image processing operations carried out in a vehicle.

BACKGROUND

Many vehicles employ one or more cameras for various purposes. For example, a camera mounted on a grille of a vehicle may be coupled to an electronic assembly having a first image processing component that processes images in a video feed provided by the camera in order to detect other vehicles traveling in front of the vehicle. The electronic assembly can use information obtained through the image processing operation and communicate with a vehicle controller for executing automatic braking operations when the information indicates that the vehicle is travelling too close to another vehicle ahead and that there is a risk of rear-ending the other vehicle.

The electronic assembly may also have a second image processing component that processes images in the video feed that may be inspected by an individual for insurance purposes. The image processing may be directed at obtaining information to identify certain events that may have taken place during an accident, prior to the accident, and/or after the accident involving another vehicle. The information may indicate that the accident occurred as a result of the other vehicle abruptly changing lanes without using a turn signal. Such information may be used to file an insurance claim and/or to file a police report.

As can be understood, the camera in the example described above is being used to capture images that are used for two different purposes—one that is associated with vehicle operations and the other for obtaining accident-related information that may be reviewed by an individual. When used for capturing images for use in carrying out vehicle operations, it may be desirable to configure the camera settings of the camera in a certain manner. For example, it may be desirable to provide camera settings such as a high frame repetition rate, a focused field-of-view, and good color balance that would enable the first image processing component to process images for detecting moving objects quickly and accurately in the lane in which the vehicle is moving. On the other hand, when used for capturing images for obtaining accident-related information, it may be desirable to configure the camera settings of the camera in a different manner. For example, it may be desirable to provide camera settings that produce images having high resolution and a wide field-of-view. The wide field-of-view may allow the image processing component (or other detection components such as radar or lidar) to monitor the other vehicle traveling in an adjacent lane prior to changing lanes.

In this example, the processing carried out by the first image processing component may be deemed to have a higher priority than that carried out by the second image processing component because it is more important to avoid rear-ending the vehicle traveling in front than it is to file an insurance claim or a police report after the accident has occurred. Typically, in conventional practice, the camera settings on the camera is set to cater to the requirements of

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
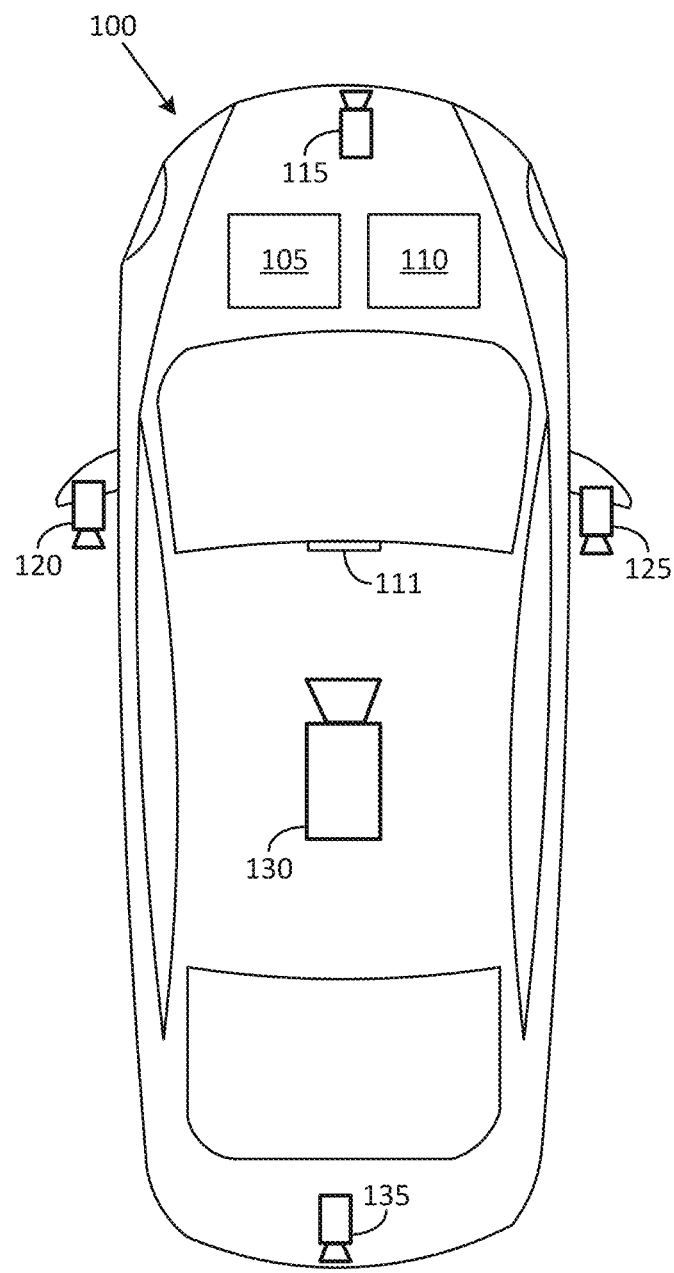
FIG. 1 shows an exemplary vehicle equipped with multiple cameras.

In terms of a general overview, this disclosure is generally directed to systems and methods for sharing a video feed of a camera among multiple image processing components in a vehicle. In an exemplary method, a first priority is applied to a first image processing component that performs a first image processing function upon the video feed provided by the camera. A second priority that is lower than the first priority, is applied to a second image processing component that performs a second image processing function upon the video feed. One or both of the image processing components can be an integrated circuit, such as, for example, a System-on-a-chip (SoC), an application specific integrated circuit (ASIC), or a field programmable gate array (FPGA). The first image processing function may be deemed to be more important than the second image processing function based on various criteria, such as, for example, based on safety considerations. The first image processing component may be allowed to apply various camera settings on the camera and may do so based on various considerations associated with the first image processing function. In some cases, these camera settings may not be optimal for the second image processing component. The first image processing component may relinquish control of the camera settings at various times so as to allow the second image processing component to apply other camera settings on the camera that may be more suitable for the second image processing function. An access arbitrator may be used to perform various operations associated with providing access to the camera for applying the camera settings by the first and second image processing components.

ILLUSTRATIVE EMBODIMENTS

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. Any functionality described with respect to a particular device or component may be performed by another device or component in alternative embodiments. For example, various aspects of the disclosure that pertain to a "camera" are equally applicable to other detection devices such as, for example, a radio detection and ranging (radar) device or a light detection and ranging (LIDAR) device. Thus, any reference to an image processing component is equally applicable to a data processing component, and any reference to an image processing function is equally applicable to a data processing function. For example, an image processing component (which may be an SoC or an ASIC, for example) may be used to process imaging data generated by a camera, and another data processing component (which may also be an SoC or an ASIC) may be used to process data generated by a radar device, and so on. All such embodiments are encompassed herein in accordance with the disclosure. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

Furthermore, certain words and phrases that are used herein should be interpreted as referring to various objects and actions that are generally understood in various forms and equivalencies by persons of ordinary skill in the art. For example, the word "image" as used herein can pertain to any type of image that is produced by a device such as a digital camera or a video camera. A "video feed" as used herein refers to a video stream produced by a device such as a video camera. The video stream can include image frames. Each image frame may be processed by an image processing component. The phrase "image processing component" as used herein can be any type of electronic component that processes images. A few examples of such electronic components can include a standard integrated circuit, a System-on-a-Chip (SoC), an application specific integrated circuit (ASIC), a field programmable gate array (FPGA), or a printed circuit board assembly (PCBA). The word "code" as used herein generally refers to various types of software and/or firmware programs that are executable by a processor.

FIG. 1 illustrates an exemplary vehicle 100 equipped with multiple cameras. The vehicle 100 may be one of various types of vehicles such as a gasoline powered vehicle, an electric vehicle, a hybrid electric vehicle, or an autonomous vehicle, and can include various items such as a vehicle computer 105 and an auxiliary operations computer 110.

The vehicle computer 105 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.).

The auxiliary operations computer 110 may be used to support various operations in accordance with the disclosure. In some cases, some or all of the components of the auxiliary operations computer 110 may be integrated into the vehicle computer 105. Accordingly, various operations in accordance with the disclosure may be executed by the auxiliary operations computer 110 in an independent manner. For example, the auxiliary operations computer 110 may carry out some operations associated with providing camera settings of one or more cameras in the vehicle without interacting with the vehicle computer 105. The auxiliary operations computer 110 may carry out some other operations in cooperation with the vehicle computer 105. For example, the auxiliary operations computer 110 may use information obtained by processing a video feed from a camera to inform the vehicle computer 105 to execute a vehicle operation such as braking.

In the illustration shown in FIG. 1, the vehicle 100 is equipped with five cameras. In other scenarios, fewer or a greater number of cameras may be provided. The five cameras include a front-facing camera 115, a rear-facing camera 135, a roof-mounted camera 130, a driver-side mirror camera 120, and a passenger-side mirror camera 125. The front-facing camera 115, which may be mounted upon one of various parts in the front of the vehicle 100, such as a grille or a bumper, produces images that may be used, for example, by the vehicle computer 105 and/or by the auxiliary operations computer 110, to interact with an automatic braking system of the vehicle 100. The automatic braking system may slow down the vehicle 100 if the images produced by the front-facing camera 115 indicate that the vehicle 100 is too close to another vehicle traveling in front of the vehicle 100.

The rear-facing camera 135 may be used, for example, to display upon a display screen of an infotainment system 111, images of objects located behind the vehicle 100. A driver of the vehicle 100 may view these images when performing a reversing operation upon the vehicle 100.

The roof-mounted camera 130 may be a part of a vehicle navigation system when the vehicle 100 is an autonomous vehicle. Images produced by the roof-mounted camera 130 may be processed by the vehicle computer 105 and/or by the auxiliary operations computer 110 for detecting and identifying objects ahead and/or around the vehicle. The roof-mounted camera 130 can have a wide-angle field-of-view and/or may be rotatable upon a mounting base. The vehicle 100 can use information obtained from the image processing to navigate around obstacles.

The driver-side mirror camera 120 may be used for capturing images of vehicles in an adjacent lane on the driver side of the vehicle 100 and the passenger-side mirror camera 125 may be used for capturing images of vehicles in adjacent lanes on the passenger side of the vehicle 100. In an exemplary application, various images captured by the driver-side mirror camera 120, the passenger-side mirror camera 125, and the rear-facing camera 135 may be combined by the vehicle computer 105 and/or by the auxiliary operations computer 110 to produce a computer-generated image that provides a 360-degree field-of-coverage around the vehicle 100. The computer-generated image may be displayed upon a display screen of the infotainment system 111 to assist the driver drive the vehicle 100 or may be used by the vehicle computer 105 to carry out some types of operations.

The various cameras provided in the vehicle 100 can be any of various types of cameras and can incorporate various types of technologies. For example, a night-vision camera having infra-red lighting and sensors may be used for capturing images in low light conditions. The low light conditions may be present when the vehicle 100 is parked at a spot during the night. The images captured by the night-vison camera may be used for security purposes such as for preventing vandalism or theft. A stereo camera may be used to capture images that provide depth information that may be useful for determining separation distance between the vehicle 100 and other vehicles, when the vehicle 100 is in motion. In another application where minimal processing latency is desired, a pair of cameras may be configured for generating a high frame-rate video feed. The high frame-rate video feed may be generated by interlacing the video feeds of the two cameras. In yet another application, a camera system configured for light detection and ranging (LIDAR) applications may be used. LIDAR applications can include long distance imaging and/or short distance imaging. Some camera systems may include power saving features that may be useful for operations in certain environments.

Figure 2:
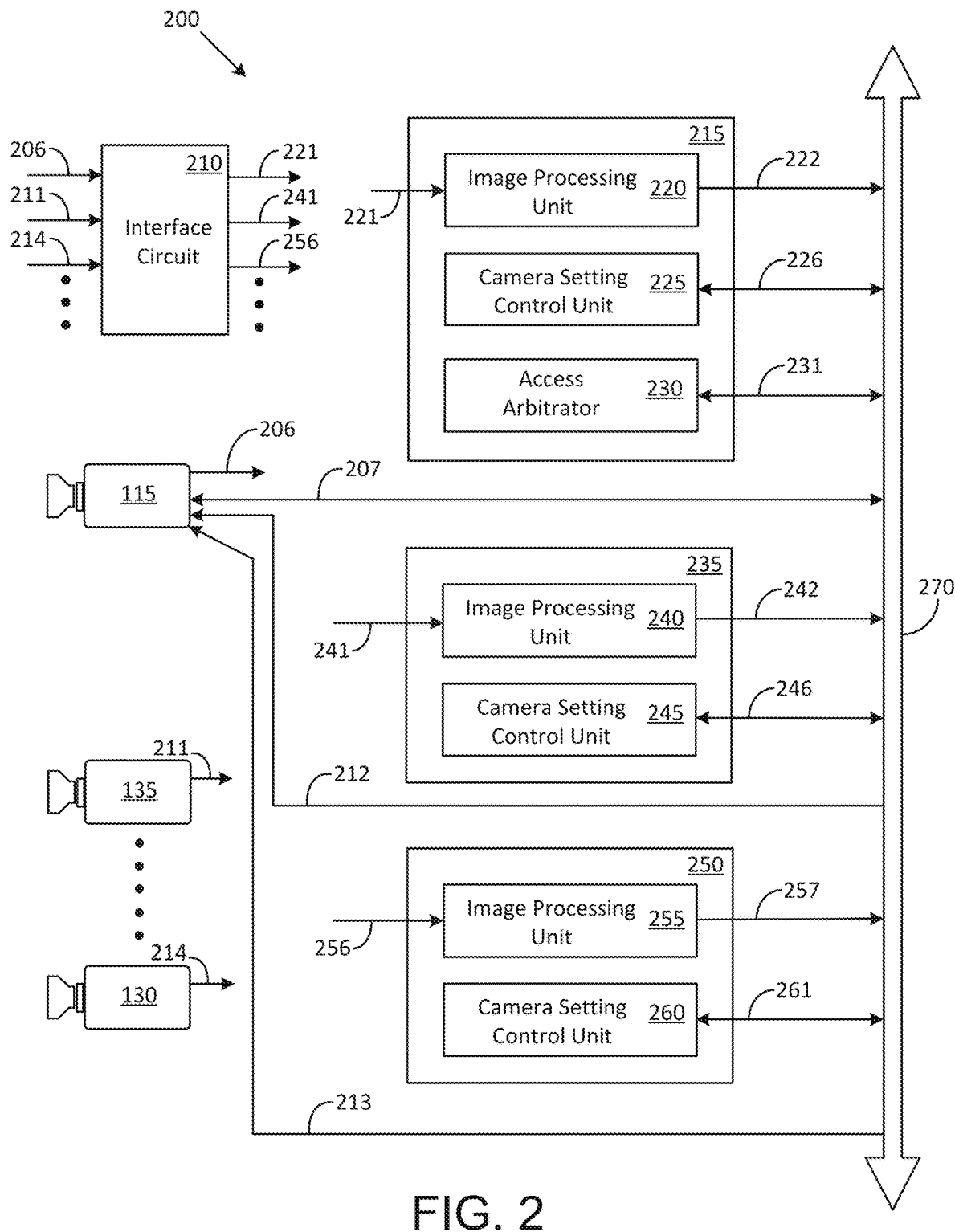
FIG. 2 shows a first exemplary embodiment of a system for sharing camera setting control of a camera of the vehicle in accordance with the disclosure.

FIG. 2 shows a first exemplary embodiment of a system 200 in accordance with the disclosure for sharing camera setting control of a camera of the vehicle 100 in accordance with the disclosure. The system 200, which may be incorporated into the auxiliary operations computer 110 and/or the vehicle computer 105 in some implementations, can include several image processing components. In the example illustration shown in FIG. 2, each of the various cameras provided in the vehicle 100 produces a video feed that can be coupled to an interface circuit 210. For example, a video feed of the front-facing camera 115 may be propagated to the interface circuit 210 via a link 206. The link 206 can be implemented in various ways such as by using a wired medium or a wireless medium. The wireless medium may use one or more of various wireless technologies such as Bluetooth®, Ultra-Wideband, Wi-Fi, ZigBee®, or near-field-communications (NFC). Similarly, a video feed of the rear-facing camera 135 may be propagated to the interface circuit 210 via a link 211, a video feed of the roof-mounted camera 130 may be propagated to the interface circuit 210 via a link 214, and so on.

The interface circuit 210 may include a selector circuit and/or a routing circuit arranged to couple one or more of the video feeds from the various cameras into one or more image processing components. For example, the interface circuit 210 may be configured to route a video feed of the front-facing camera 115 into an image processing component 215 (via a link 221). The image processing component 215 performs a first image processing function upon the video feed. The interface circuit 210 may be further configured to route the video feed of the front-facing camera 115 into an image processing component 235 (via a link 241). The image processing component 235 performs a second image processing function upon the video feed.

In an exemplary method of use of the system 200, a higher priority may be applied to the first image processing function performed upon the video feed by the image processing component 215 than to the second image processing function performed upon the video feed by the image processing component 235. One of the criteria that can be used to do so may be attributed to the first image processing function being directed at safety-related operations such as speed control, collision avoidance, and automatic braking. Another criterion may pertain to satisfying regulatory requirements such as, for example, federal laws and county regulations. Yet another criterion may relate to operational characteristics of the image processing component 215 and/or the image processing component 235, such as, for example, a latency specification of the SoC (when the image processing component 215 and/or the image processing component 235 is an SoC), a type of an algorithm used to execute the first image processing function, and/or a different type of algorithm used to execute the second image processing function.

The operations associated with the image processing component 235 may be deemed as being less of a priority than those associated with the image processing component 215. For example, operations associated with the image processing component 235 may be directed at obtaining information for filing of an insurance claim or a police report if an accident were to occur. In this case, the second image processing function performed upon the video feed of the front-facing camera 115 by the image processing component 235 may involve identifying certain events that occurred during the accident, prior to the accident, and/or after the accident. Such events may reveal that the accident occurred as a result of another vehicle abruptly swerving into the path of the vehicle 100, and can be used for the insurance claim or the police report.

In view of the higher priority applied to the first image processing function performed by the image processing component 215, it may be desirable that images provided by the front-facing camera 115 to the image processing component 215 have a first set of characteristics such as, for example, a high frame repetition rate and a field-of-view that is primarily geared towards capturing images of vehicles moving ahead of the vehicle 100 in a lane in which the vehicle 100 is moving. Such characteristics, which can be obtained by applying one or more of a first type of camera settings on the front-facing camera 115, may be suitable to obtain images containing fewer objects, thus allowing the image processing component 215 to process the images at a higher speed and communicate the findings to the vehicle computer 105 for performing operations such as speed control, collision avoidance, and automatic braking.

On the other hand, it may be desirable that images provided by the front-facing camera 115 to the image processing component 235 for carrying out the second image processing function have a second set of characteristics that are different than the first set of characteristics. For example, the second set of characteristics may involve applying one or more of a second type of camera settings on the front-facing camera 115 so as to obtain images having a wide field-of-view and high-resolution. The wide field-ofview feature in the images may help obtain information about vehicles traveling in the adjacent lanes. The images processed by the image processing component 235 may, for example, provide information pertaining to an accident caused by another vehicle that was traveling in an adjacent lane. The high-resolution feature in the images may help obtain information regarding the other vehicle, such as, for example, a registration number and a state in which the vehicle is registered. Some other examples of camera settings may include a lens setting, an exposure time setting, white balance setting, color tone setting, and color balance setting.

It may be further desirable that a video feed provided by the front-facing camera 115 to the image processing component 250 (via the link 256) have a third set of characteristics that are different than the first set of characteristics and/or second set of characteristics. The third set of characteristics may involve applying one or more of a third type of camera settings on the front-facing camera 115 so as to obtain images having characteristics that are different than those desirable for the first image processing function and the second image processing function.

In this exemplary embodiment, the image processing component 215 includes an image processing unit 220, camera setting control unit 225, and an access arbitrator 230. The image processing unit 220 may execute code for performing the first image processing function upon the video feed provided by the front-facing camera 115 via the link 221. In an exemplary implementation, the video feed includes video frames containing image data in a compressed or uncompressed format. The video frames may be processed by using code that includes a first algorithm. Information obtained by processing the video frames is provided as an output of the image processing component 215 via a link 222. The link 222 may be used to communicatively couple the image processing component 215 to the auxiliary operations computer 110 and/or vehicle computer 105 via a bus 270.

The bus 270 can be implemented using one or more of various wired and/or wireless technologies. For example, the bus 270 can be a vehicle bus that uses a controller area network (CAN) bus protocol, a Media Oriented Systems Transport (MOST) bus protocol, and/or a CAN flexible data (CAN-FD) bus protocol. Some or all portions of the bus 270 may also be implemented using wireless technologies such as Bluetooth®, ZigBee®, or near-field-communications (NFC), cellular, Wi-Fi, Wi-Fi direct, machine-to-machine communication, and/or man-to-machine communication to accommodate communications between various elements of the system 200 such as the image processing component 235, the image processing component 215, and the image processing component 250 and devices such as, for example, the auxiliary operations computer 110, the vehicle computer 105, and the infotainment system 111.

The camera setting control unit 225 in the image processing component 215 may be used to communicate with the front-facing camera 115 for various purposes include for setting camera controls. The signals, which may be bi-directional in nature, are propagated to/from the front-facing camera 115 via a link 226, the bus 270, and a link 207.

The access arbitrator 230 may include hardware and code that is used to apply various priorities to the image processing components of the system 200. In this example, the first image processing function that is carried out by the image processing component 215 has the highest priority. Consequently, the access arbitrator 230 grants the camera setting control unit 225 high-priority access to the camera settings of the front-facing camera 115. The access arbitrator 230 may communicate with the front-facing camera 115 via the link 231, the link 231 and the link 207 for performing various operations. The access arbitrator 230 may also communicate with other image processing components of the system 200, such as the image processing component 235 and the image processing components 250 via the bus 270 when performing operations with respect to the front-facing camera 115 and/or other cameras in the vehicle 100.

In one exemplary scenario, the camera setting control unit 225 transmits to the front-facing camera 115, via the link 226, the bus 270, and the link 207, one or more control signals that configure the camera settings of the front-facing camera 115. The camera settings can pertain to various parameters such as, for example, a field-of-view setting, a lens setting (zoom factor, for example), a white balance setting, and an image resolution setting.

The other image processing components of the system 200 may be made aware of operations carried out by the access arbitrator 230, such as the camera setting control unit 225 being granted access to the front-facing camera 115, and the camera settings that have been carried out upon the front-facing camera 115 by the camera setting control unit 225.

The image processing component 235 includes an image processing unit 240, and a camera setting control unit 245. The image processing unit 240 may execute code for performing the second image processing function upon the video feed provided by the front-facing camera 115 via the link 241. In the exemplary implementation described above, the video feed includes video frames containing image data in a compressed or uncompressed format. The video frames may be processed by using code that includes a second algorithm. Information obtained by processing the video frames is provided as an output of the image processing component 235 via a link 242. The link 242 may be used to communicatively couple the image processing component 235 to the auxiliary operations computer 110 and/or vehicle computer 105 via the bus 270.

In the exemplary scenario described above the camera setting control unit 225 of the image processing component 215 has configured the camera settings of the front-facing camera 115 in accordance with what is desirable for carrying out the first image processing function by the image processing unit 220. The second image processing function performed by the image processing component 235 has a lower priority than the first image processing function and the camera settings carried out by the camera setting control unit 225 may not necessarily be optimal for the second image processing function. However, the image processing component 235 executes the second image processing function based on the camera settings carried out by the camera setting control unit 225 due to the lower priority placed upon the second image processing function.

At some later instant in time, the image processing component 215 may inform the access arbitrator 230 that the first image processing function does not require the first priority status for a period of time. For example, the vehicle 100 may be in a stopped condition and it may not be necessary for the image processing component 215 to monitor vehicles traveling in a lane ahead of the vehicle 100. At this time, and in accordance with the disclosure, the image processing component 215 can relinquish control of the camera settings of the front-facing camera 115. The access arbitrator 230 may then grant the camera setting control unit 245 of the image processing component 235, access to the camera settings of the front-facing camera 115.

The camera setting control unit 245 transmits to the front-facing camera 115, via the link 246, the bus 270, and the link 212, one or more control signals that configure the camera settings of the front-facing camera 115 in accordance with the second image processing function performed by the image processing unit 240. The camera settings can pertain to various parameters such as, for example, a wider field-of-view setting (a wide-angle view, for example) and a higher image resolution setting.

At this time, in one exemplary case, the image processing unit 220 may suspend execution of the first image processing function in the image processing unit 220. In another exemplary case, the image processing unit 220 may execute the first image processing function taking into consideration the camera settings carried out by the camera setting control unit 245 of the image processing component 235.

The image processing unit 220 may reassert the priority status at a later instant in time such as, for example, when the vehicle 100 resumes movement, and can request the access arbitrator 230 to grant access to the front-facing camera 115 for re-applying the camera settings.

The operations described above may be further applied to other image processing components in the system 200, such as, for example, the image processing component 250 to which a priority may be applied that is lower than the priorities applied to the image processing component 215 and the image processing component 235. Thus, for example, the camera setting control unit 260 of the image processing component 250 may be allowed to configure the camera settings of the front-facing camera 115 when the image processing component 215 and the image processing component 235 relinquish control of the camera settings of the front-facing camera 115. The camera setting control unit 260 can transmit to the front-facing camera 115, via the link 261, the bus 270, and the link 213, one or more control signals that configure the camera settings of the front-facing camera 115 in accordance with a third image processing function performed by the image processing unit 255. Information obtained by processing the video feed provided on the link 256, by the image processing component 250 is output to the bus 270 via a link 257.

The operations described above may not only be applied to the front-facing camera 115 but to other cameras of the vehicle 100 as well. Accordingly, in one exemplary scenario, the interface circuit 210 may be configured to route a video feed of the rear-facing camera 135 to two or more of the image processing components of the system 200, such as the image processing component 215, the image processing component 235, and the image processing component 250. The priority scheme may be applied to two or more of the image processing components according to their usage of the rear-facing camera 135 in terms of the image processing functions.

As described above, the access arbitrator 230 is incorporated inside the image processing component 215. Consequently, the image processing component 215 becomes a primary component for applying priorities and applying camera settings by the various image processing components of the system 200. This configuration may be implemented in applications where the image processing function executed by the image processing unit 220 is identifiable as having the highest priority amongst all the image processing functions executed in the system 200 and where the access arbitrator 230 can be incorporated into the packaging of the image processing component 215. For example, when the image processing component 215 is a SoC, the access arbitrator 230 can be chip that is incorporated into the SoC package. Some cost benefits may be obtained by doing so.

However, in some cases, the image processing component 215 may be provided in the form of an integrated circuit such as an ASIC, and it may be impractical to incorporate the access arbitrator 230 into the ASIC. Furthermore, the system 200 may be employed in various types of vehicles having various types and numbers of cameras. Consequently, it may be difficult to determine beforehand, whether the highest priority should be applied to the image processing function executed by the image processing unit 220. In such situations, it may be desirable to provide the access arbitrator 230 in the form of a stand-alone element that is not incorporated into an image processing component.

As an alternative solution, multiple access arbitrators may be used such as by incorporating the access arbitrator 230 into each of the multiple image processing components. This alternative solution offers high flexibility because the image processing components can be arranged in a circuit configuration where the access arbitrators provided in some or all of the image processing components can communicate with each other on a peer-to-peer basis. Various schemes such as polling schemes and carrier sense multiple access (CSMA) may be employed for determining and/or enforcing priority in terms of access to camera settings of a camera.

Figure 3:
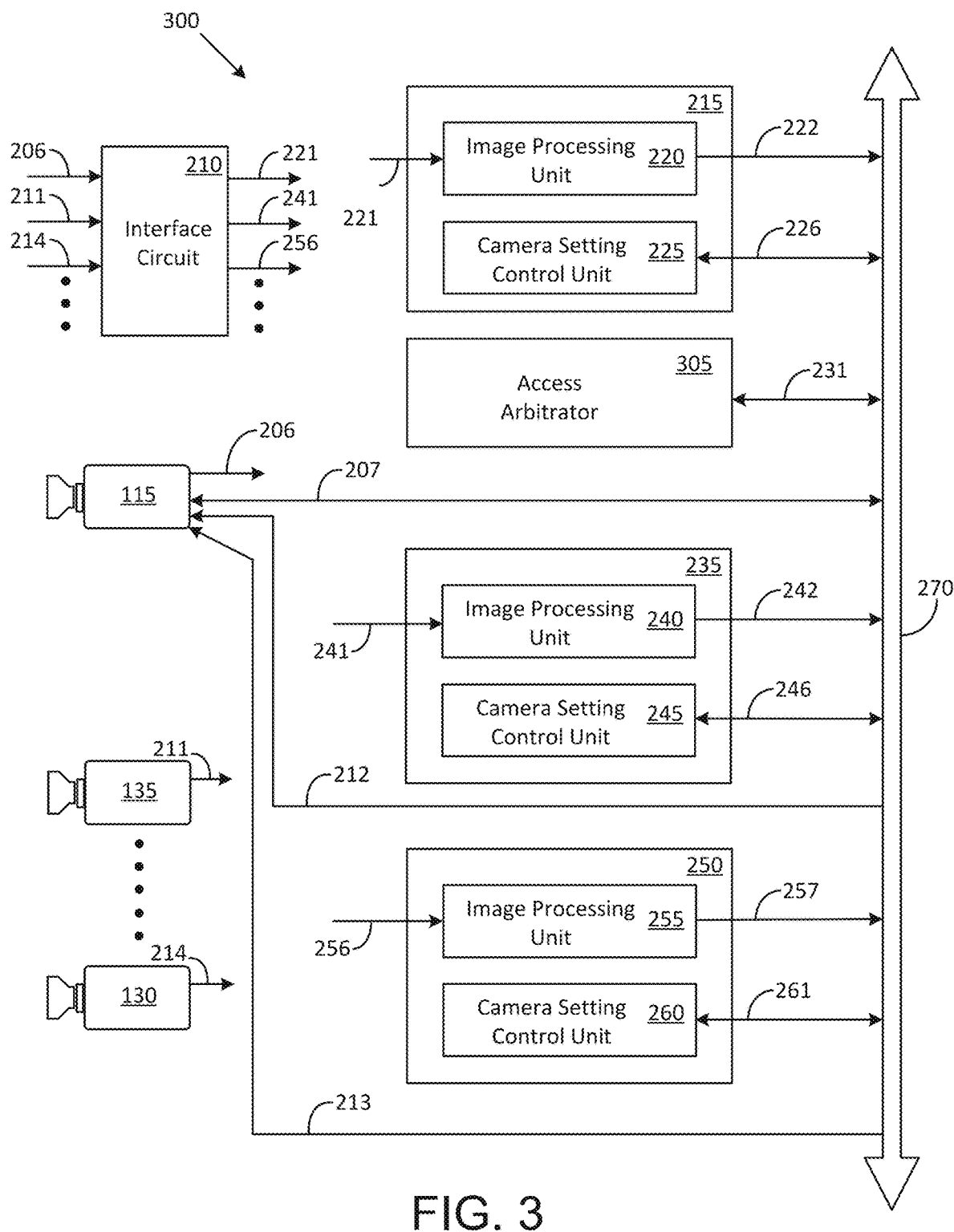
FIG. 3 shows a second exemplary embodiment of a system for sharing camera setting control of a camera of the vehicle in accordance with the disclosure.

FIG. 3 shows a second exemplary embodiment of a system 300 in accordance with the disclosure for sharing camera setting control of a camera of the vehicle 100 in accordance with the disclosure. The system 300 includes all the components described above with respect to the system 200 shown in FIG. 2. However, in this embodiment, the access arbitrator 305 is a stand-alone element that can communicate via the bus 270 with various image processing components and one or more cameras to execute the various operations described above.

Figure 4:
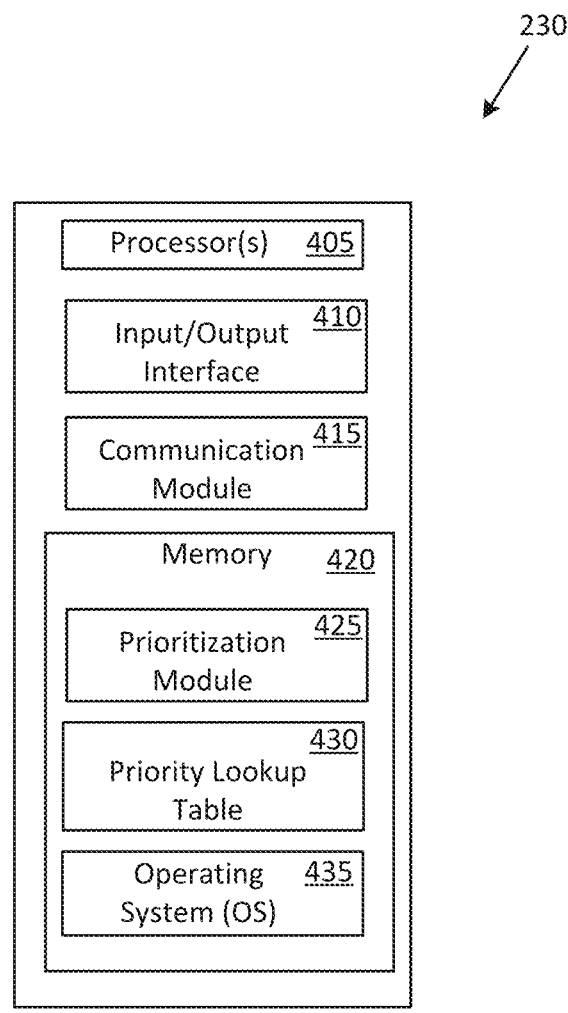
FIG. 4 illustrates some exemplary components that may be included in an access arbitrator used for configuring the multiple cameras of the vehicle in accordance with the disclosure.

FIG. 4 illustrates some exemplary components that may be included in the access arbitrator 230 in accordance with the disclosure. The following description is equally applicable to the access arbitrator 305. In the exemplary implementation shown in FIG. 4, the access arbitrator 230 includes a processor 405, an input/output interface 410, a communication module 415, and a memory 420.

The input/output interface 410 is configured to communicatively couple the access arbitrator 230 to the bus 270 so as to allow communications and signal transfers between the access arbitrator 230 and components such as one or more cameras and one or more image processing components.

The communication module 415 can include one or more wireless transceivers, such as, for example, a Bluetooth Low Energy Module (BLEM), that allow the access arbitrator 230 to communicate with devices that may not be tied to the bus 270. For example, the communication module 415 can include a wireless transceiver that communicates with a computer that may be used to provision the system 200. Provisioning the system 200 can include defining priorities and providing code for executing various image processing functionalities in the image processing components.

The memory 420, which is one example of a non-transitory computer-readable medium, may be used to store an operating system (OS) 435, a priority lookup table 430, and various code modules such as a prioritization module 425. The code modules are provided in the form of computer-executable instructions that can be executed by the processor 405 for performing various operations in accordance with the disclosure.

The prioritization module 425 may be executed by the processor 405 for performing various operations related to sharing camera setting control among multiple image processing components. For example, the prioritization module 425 may identify and/or assign priorities to various image processing components by using the priority lookup table 430. The processor 405 may receive input from various sources in order to assign priorities to the various image processing components. In one exemplary implementation, a manufacturer of the vehicle 100 may configure the priority lookup table 430. In another exemplary implementation, a dealership or an after-market vendor of a device that is installed in the vehicle 100 (such as one or more cameras, and/or the infotainment system 111) may configure the priority lookup table 430.

The priority lookup table 430 can be implemented in various ways. In one exemplary implementation, the identities of various image processing components (and/or image processing functions) can be configured as a stack in ascending or descending order of priority. As one example, the priority lookup table 430 may include an identity of the image processing component 215 in a first memory location, an identity of the image processing component 235 at a second memory location located below the first memory location, and an identity of the image processing component 250 at a third memory location located below the second memory location, and so on. The locations indicate an order of priority for the image processing functions carried out by the respective image processing components.

In another exemplary implementation, each of the image processing components may be provided with a numerical value that indicates a priority level. For example, a number "1" may be associated with the image processing component 215, a number "2" may be associated with the image processing component 235, and a number "3" may be associated with the image processing component 250. The processor 405 can use the numerical values to identify priorities and permit camera setting access to the image processing component having the highest priority.

The priority levels of the various image processing components may be assigned on the basis of various criteria. One criterion that may be used as a primary criterion for assigning the highest priority is a safety of the driver of the vehicle 100. Other criteria may include protecting the vehicle 100 from damage due to accidents and vandalism. Yet another criterion may be based on driving activities. Various levels of granularity may be applied when assigning priority on driving activities. For example, driver assistance provided by an autonomous vehicle (when the vehicle 100 is an autonomous vehicle) may be one level of granularity. A finer level of granularity may include operations such as adaptive cruise control (ACC) and lane change assist (LCA). Camera settings carried out by a camera setting control unit such as the camera setting control unit 225, may involve configuring a camera such as the front-facing camera 115 with a first camera setting when the vehicle is performing ACC operations and a second camera setting when the vehicle is performing LCA operations. In one exemplary situation, the processor 405 may determine that ACC operations should be provided a higher priority than the LCA operations due to a first set of road and/or traffic conditions. In another exemplary situation, the LCA operations may be provided a higher priority than the ACC operations due to a different set of road and/or traffic conditions.

In some cases, the processor 405 may allocate and/or predict usage of the various image processing components and assign priorities accordingly. In some other cases, the processor 405 may execute a time-sharing configuration where two or more image processing components use a time-sharing protocol to share a camera resource when carrying out camera settings upon a camera. The processor 405 may preclude execution of the time-sharing configuration in view of certain constraints such as latency and camera capabilities.

The processor 405 may also impose some restrictions upon camera settings that can be carried out by a camera control unit upon a camera. For example, the processor 405 may impose an intermediate camera setting upon a camera when a camera setting control unit of an image processing component seeks to apply two different camera settings upon the camera over a short time period.

In some situations, a first image processing function may have a higher priority than a second image processing function executed by an image processing unit. The two functions may require two different camera settings. In such a situation, the processor 405 may allow the camera to be configured to have a first camera setting and images used for the second processing function may be digitally processed to correct imaging artifacts.

The processor 405 may execute certain operations by using technologies such as fuzzy logic and artificial intelligence. Fuzzy logic may be helpful for balancing usage of resources and avoiding deadlocks between multiple image processing components. The processor 405 may further execute certain operations based on historical data. Such data may be used to carry out certain types of camera settings upon a camera.

Figure 5:
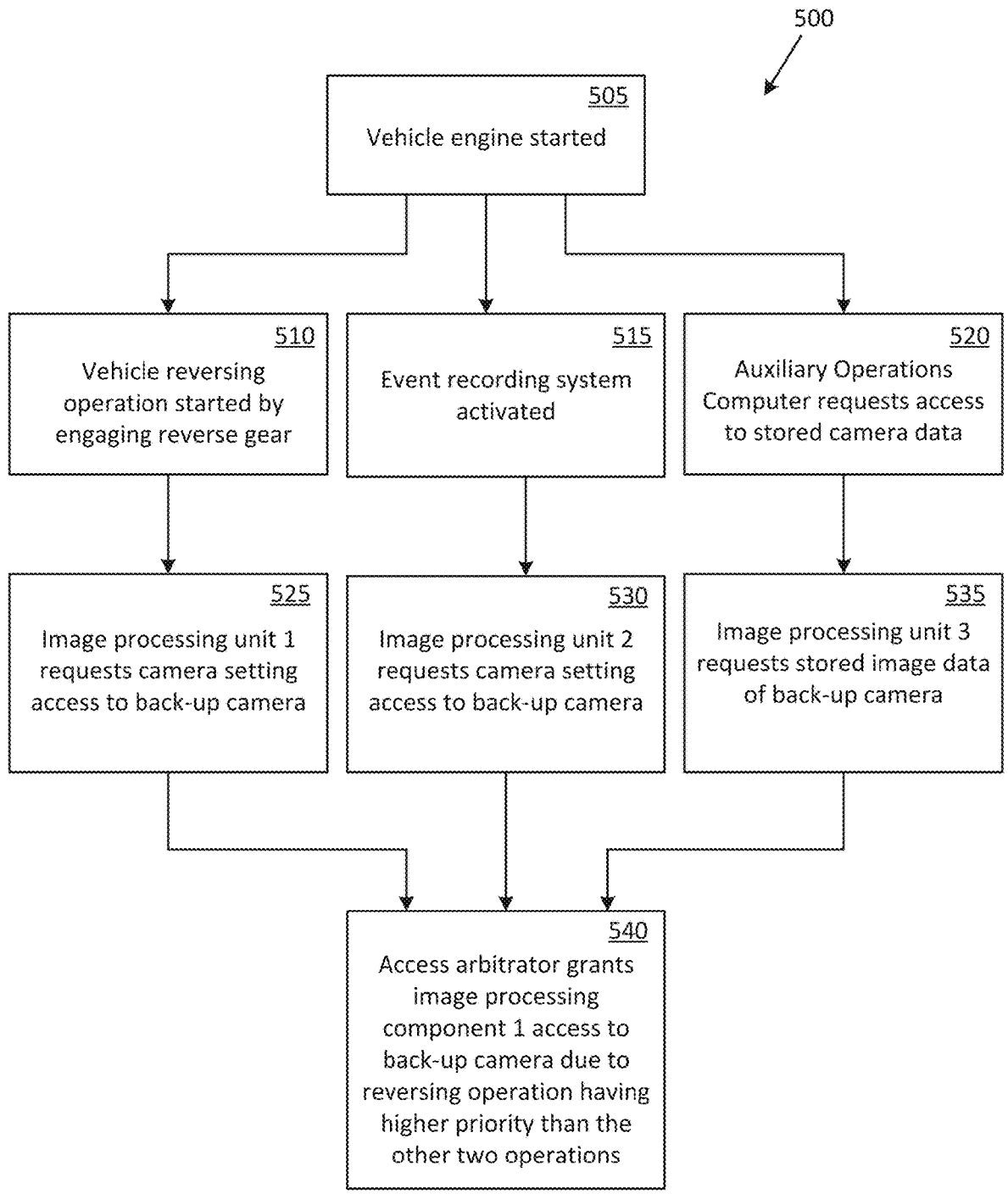
FIG. 5 shows an exemplary flowchart of a method of operation of an access arbitrator in accordance with the disclosure.

FIG. 5 is an exemplary flowchart 500 of a method of operation of an access arbitrator such as the access arbitrator 230 or the access arbitrator 305 described herein. The flowchart 500 illustrates a sequence of operations that can be implemented in hardware, software, or a combination thereof. In the context of software, the operations represent computer-executable instructions stored on one or more non-transitory computer-readable media such as the memory 420 that, when executed by one or more processors such as the processor 405 perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel.

At block 505, a vehicle engine is started. At block 510, the driver of the vehicle may engage a reverse gear of the vehicle in order to carry out a reversing maneuver. At block 525, an image processing unit such as the image processing unit 220 in the image processing component 215 requests an access arbitrator to allow the camera setting control unit 225 to configure the camera settings of a backup camera installed in the vehicle. Images provided by the backup camera may be displayed on a display screen of the infotainment system 111 for assisting the driver perform the reversing maneuver.

At block 515, an event recording system that may be installed in the vehicle is automatically activated when the vehicle engine is started. The event recording system may be used to record events such as accidents and the stored data used for insurance purposes or for filing police reports. At block 530, another image processing unit such as the image processing unit 240 in the image processing component 235 requests the access arbitrator to allow the camera setting control unit 245 to configure the camera settings of the backup camera installed in the vehicle. Images provided by the backup camera may be stored in a memory device of the event recording system or may be propagated to a computer of an insurance company.

At block 520, a computer such as the auxiliary operations computer 110 may initiate a request to the system 200 for access to stored camera data. At block 535, yet another image processing unit such as the image processing unit 255 in the image processing component 250 requests the access arbitrator to allow the camera setting control unit 260 to configure the camera settings of the backup camera installed in the vehicle.

At block 540, an access arbitrator such as the access arbitrator 230 or the access arbitrator 305, identifies the priorities of the three image processing components. This action may be carried out by the processor 405 accessing the priority lookup table 430. The function performed by the image processing unit 220 in the image processing component 215 may have the highest priority because the safety of the driver has to be ensured when the vehicle is in motion. The other two functions performed by the other image processing units have a lower priority and can be executed at a later time. Based on the priority status of the image processing unit 220, the access arbitrator may grant the camera setting control unit 225 access to configure the camera settings of the backup camera.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an exemplary embodiment," "exemplary implementation," etc., indicate that the embodiment or implementation described may include a particular feature, structure, or characteristic, but every embodiment or implementation may not necessarily include the particular feature, structure, or characteristic. Moreover, such phrases are not necessarily referring to the same embodiment or implementation. Further, when a particular feature, structure, or characteristic is described in connection with an embodiment or implementation, one skilled in the art will recognize such feature, structure, or characteristic in connection with other embodiments or implementations whether or not explicitly described. For example, various features, aspects, and actions described above with respect to an autonomous parking maneuver are applicable to various other autonomous maneuvers and must be interpreted accordingly.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 420, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   applying a first priority to a first data processing function performed by a first data processing component in a vehicle;
   applying a second priority to a second data processing function performed by a second data processing component in the vehicle, wherein the second priority is lower than the first priority; and
   applying, based on the first priority, upon a data capture device in the vehicle, a first setting that is matched to the first data processing function,
   wherein the data capture device is a camera, wherein the first data processing function is a first image processing function, wherein the first data processing component is one of a first system-on-a-chip (SoC) or a first application specific integrated circuit (ASIC), and wherein, based on the first priority, the one of the first SoC or the first ASIC is provided camera control for applying a first camera setting upon the camera,
   wherein the first camera setting is one of an exposure setting, a frame rate setting, a white balance setting, a lens setting, or a resolution setting, and
   wherein the second data processing function is a second image processing function, and wherein the second data processing component is one of a second SoC or a second ASIC, the method further comprising:
   applying, upon the camera, when the one of the first SoC or the first ASIC relinquishes camera control, a second camera setting that is matched to the second data processing function.

2. The method of claim 1, wherein the one of the second SoC or the second ASIC is provided access to the camera for applying the second camera setting.

3. The method of claim 1, wherein a first latency parameter is applicable to the first image processing function executed by the first data processing component during processing of a first video feed provided by the camera to the first data processing component, and wherein the frame rate setting of the camera is based at least in part on the first latency parameter.

4. The method of claim 3, wherein a second latency parameter is applicable to the second image processing function executed by the second data processing component during processing of a second video feed provided by the camera to the second data processing component, and wherein the frame rate setting of the camera is based at least in part, on an event wherein the first latency parameter has a higher priority than the second latency parameter.

5. The method of claim 1, wherein the data capture device is one of a camera, a radio detection and ranging (radar) device, or a light detection and ranging (lidar) device, and the method further comprises:
   determining the first priority based on at least a safety criterion that is applicable to an occupant of the vehicle; and
   determining the second priority based on at least a regulatory criterion that is applicable to the vehicle.

6. A method comprising:
   providing a camera in a vehicle;
   providing, in the vehicle, a first image processing component configured to perform a first image processing function;
   granting to the first image processing component, access to the camera;
   applying by the first image processing component, upon the camera, a first camera setting that is matched to the first image processing function;
   performing the first image processing function upon a video feed of the camera;
   providing, in the vehicle, a second image processing component configured to execute a second image processing function;
   applying a first priority to the second image processing function;
   applying a second priority to the first image processing function, wherein the second priority is lower than the first priority; and
   applying, based on the first priority, upon the camera, a second camera setting that is matched to the second image processing function,
   wherein applying the second camera setting upon the camera comprises:
   withdrawing grant of access to the camera by the first image processing component;
   granting to the second image processing component access to the camera;
   applying by the second image processing component, upon the camera, a second camera setting that is matched to the second image processing function; and performing the second image processing function upon the video feed of the camera.

7. The method of claim 6, wherein the first image processing component is one of a first system-on-a-chip (SoC) or a first application specific integrated circuit (ASIC) and the second image processing component is one of a second SoC or a second ASIC.

8. The method of claim 6, wherein the first camera setting is one of an exposure setting, a frame rate setting, a white balance setting, a lens setting, or a resolution setting.

9. The method of claim 8, wherein a first latency parameter is applicable to the first image processing function executed by the first image processing component during processing of the video feed and wherein the frame rate setting of the camera is based on a time-sharing protocol where the first image processing component and the second image processing component share a camera setting resource to apply the first camera setting and the second camera setting.

* * * * *